March 13, 1928. 1,662,444
F. A. TEGELER
AUTOMATIC VOLTAGE REGULATOR
Filed Nov. 6, 1925
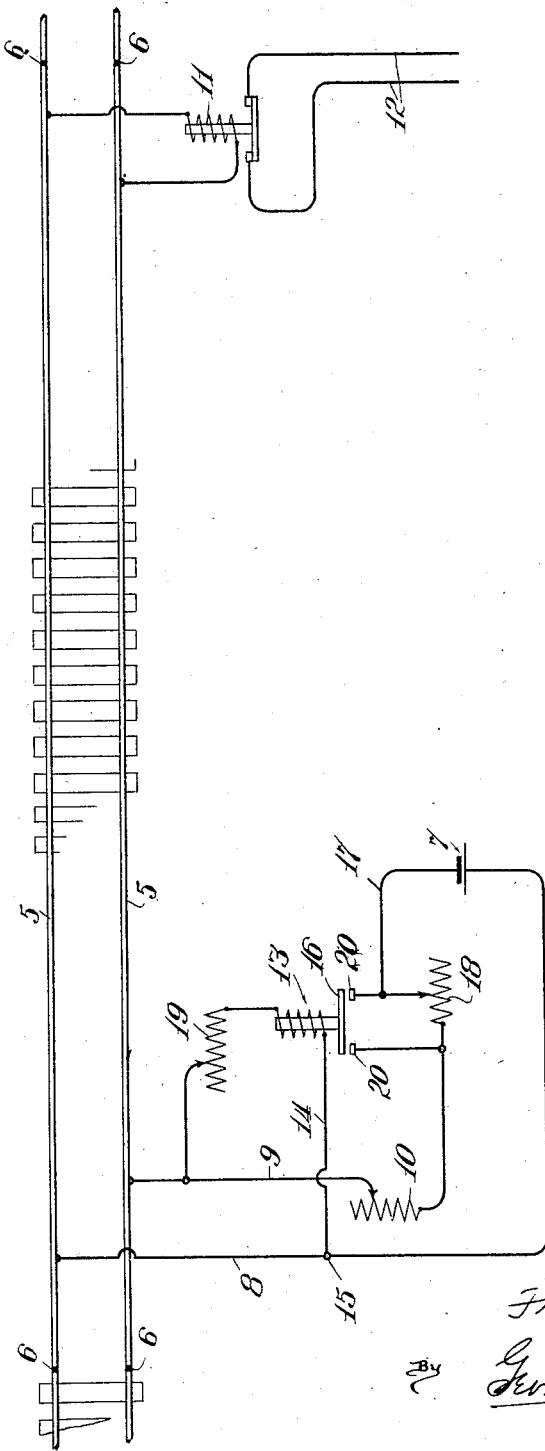
Inventor
Frederick A. Tegeler,
By George Heide
Attorney Patented Mar. 13, 1928.

1,662,444

UNITED STATES PATENT OFFICE.

FREDERICK A. TEGELER, OF ST. JOSEPH, MISSOURI.

AUTOMATIC VOLTAGE REGULATOR.

Application filed November 6, 1925. Serial No. 67,388.

My invention relates to means for automatically regulating the voltage of track circuits employed in connection with automatic railway signal systems, etc., whereby an excessively high voltage in a track circuit of the system will be automatically prevented, while on the other hand an increase of voltage is obtained when necessary.

The objects and advantages of my invention will be more readily understood from the detailed description of the accompanying drawing which schematically illustrates a track section and circuit of an automatic signal system provided with my improved regulating means.

In the track circuits of automatic signal systems as generally employed by railroads, storage batteries are usually employed for said track circuits, thus necessitating the provision on an external resistance to be arranged in series with the battery and the rails of the track, because the storage batteries practically have no internal resistance; the external resistance being necessary to prevent an excessive amount of current being used unnecessarily when the track circuit or block is occupied by a train or the block or track circuit otherwise becomes short circuited. It has also been found necessary to keep excessive heavy current from the track circuit so that the latter can be more readily shunted from the track relay by means of the circuit controllers connected to the switch stands and through the running gear of equipment such as gasoline motor cars, etc.; and furthermore, to reduce the voltage so as to avoid heavy leakage of current to adjacent track circuits or blocks which tend to maintain the track relay of an adjacent track circuit or block in energized condition at a time when it should be deenergized. It is also necessary in circuits of the type in question to avoid having a voltage of such strength as is likely to pass through the ground around a broken rail which might occur in the track circuit and which would result in energizing the track relay of said circuit or block at a time when the said track relay should be deenergized; such energizing of the track relay resulting in a false clear signal being given.

It has also been found necessary in practice to provide an external resistance which may be adjusted so as to allow the voltage on the track to be of sufficient strength to operate the track relays on long track circuits during very wet weather when the leakage of current from rail to rail is very much greater than is the case during dry weather or in the winter season when the ground is frozen and current leakage is comparatively low. Considerable difficulty has been encountered in efforts to regulate or control the voltage of circuits of the type in question, due to the fact that if the external resistances are all adjusted to permit the voltage to be great enough to operate the track relays on long track circuits during very wet weather, the resistance offered would then be so low that the voltage on the track circuit would be too high or excessive in dry or cold weather because of the very small current leakage during such last mentioned condition. It is these difficulties which are encountered in the automatic signal operating systems under the conditions as above set forth that are intended to be overcome by my invention, because it is impossible to repeatedly adjust the resistance before each rain, as the manual re-adjustment of the resistances necessary in the various units or circuits of the system is impossible.

With my invention, the external resistance is automatically adjusted or regulated so as to provide the required voltage on the rails of the track circuit under both extreme conditions above referred to, namely at a time when the track is very wet and also at a time when the track is very dry or cold and frozen.

A track circuit of the type in question usually comprises the two parallel rails 5, 5 of the track between battery and relay; the rails being insulated from adjacent rails sections by a suitable fiber insulation as at 6, 6; the insulation being usually placed between the adjacent ends of the rails and the angle bars by which the adjacent rails are secured together. A single cell storage battery is conventionally illustrated at 7 having the conductors or wires 8 and 9 leading therefrom and each connected with a separate rail of the track; the circuit, as for example line 9, being provided with a variable resistance shown at 10. As shown in the drawing, the opposite ends of the rails 5, 5 have connection with the track relays indicated at 11 of the controlled circuit formed by the lines or wires 12. The elements thus far set forth constitute a standard track circuit as now employed.

My improved voltage regulator consists in providing an additional relay shown at 13, the coils whereof are connected by means of control wire 14 to the line or wire 8 at 15, the coils being also electrically connected to the line or wire 9. 16 represents the armature of the additional relay 13. 17 is a conductor or wire leading from one pole of the cell 7 and provided with an adjustable resistance 18 arranged in series with the resistance 10 of conductor 9 at present employed in the standard track circuit. 19 represents an adjustable resistance unit arranged in series with the coils of the additional relay 13 and the track circuit or conductor 9; and 20 represent contact points for the armature of the relay 13 and electrically arranged intermediate of the track line or conductor 9 and the battery 7.

In operation, the resistance in series with the additional relay 13 is adjusted so that when the armature 16 is dropped down in contact with the contact points 20, the voltage at the relay 11 at the opposite end of the track circuit will be sufficient to operate the track relay 11 while a maximum leakage is encountered during wet weather. Adjustable resistance 18 is adjusted so that the combined resistance of resistances 18 and 10 will keep the voltage of the track circuit down to the requisite voltage necessary during dry weather and when the track is frozen in cold weather; this resistance being so adjusted that the armature 16 will be affected by the current in the coils of the additional relay 13 and with the armature therefore up out of contact with the contact points 20. The adjustable resistance 19 is adjusted so that when the voltage at the track relay 11 has fallen to a point low enough where there is just enough margin to operate, the voltage in the coil of the added relay 13 is so low that the current flowing through the coils of additional relay 13 will be insufficient to hold the armature 16, thus permitting the latter to drop into contact with contact points 20, 20, thereby closing the circuit between the contact points 20, 20 and providing a bypath around the resistance 18 which permits an increase of voltage of the track circuit sufficient to overcome the loss encountered in wet weather.

On the other hand, as the track and ground becomes dry and current leak or loss from rail to rail diminishes, the voltage in the conductors 8 and 9 of the track circuit will increase so as to permit sufficient current to pass through the coil of the relay 13, which causes the armature 16 to be attracted and be moved out of contact with contact points 20, 20. This again places resistance 18 in series with the track circuit, thereby limiting the increase of voltage in the rails of the track circuit.

With my invention, a relay is arranged to operate in parallel with the usual track relay; my additional relay being, however, arranged at the end of the track circuit where the operating current is supplied with the additional relay so arranged and adjusted as to merely receive sufficient current to attract the armature when the voltage in the track circuit is too high, thus increasing the external resistance between the battery or current source and the rails of the track and thereby decreasing the voltage on the track; while on the other hand, when the track voltage becomes so low that the track relay 11 may fail to properly operate, the voltage at additional relay 13 will likewise be so reduced that its armature 16 will be released by the coil and allowed to drop into contact with the points 20, 20, thereby shunting some of the external resistance between the current source or battery 7 and the rails, namely resistance 18, with the result that the voltage on the rails will again be increased.

I have conventionally illustrated a simple method of carrying out my invention and have described the exemplification in terms employed merely as terms of description and not as terms of limitation, as modifications may be made without, however, departing from the spirit of my invention.

What I claim is:

1. An automatic voltage regulator, comprising, in combination with the track circuit, a source of current supply connected with the rails of the track, adjustable resistances in the connections or control wires from the current source to the rails, a relay arranged in parallel with the control wires adapted to shunt certain of said resistances when the voltage in the track circuit falls below a predetermined point and to introduce the resistance when the voltage of the track circuit increases above said point.

2. An automatic voltage regulator for the track circuits of automatic signal systems, comprising, in combination with the track circuit and a source of current supply connected with the rails of the track and having an adjustable resistance in said circuit, means electrically arranged intermediate of the source of current supply and the rails whereby additional resistance is introduced into the track circuit when the voltage of the latter exceeds a predetermined degree and said resistance shunted when said voltage drops below the predetermined degree.

3. An automatic voltage regulator for the track circuits of automatic signal systems and the like, comprising, in combination with the track circuit and a source of current supply, an external resistance arranged in said circuit, and a relay, the coils whereof are electrically connected in said circuit intermediate of said resistance and the rails of the track circuit whereby the current is shunted around said resistance when the track voltage drops below a predetermined degree and the current caused to flow through said resistance when the track voltage exceeds said predetermined degree.

4. An automatic voltage regulator for the track circuits of automatic signal systems and the like, comprising, in combination with the track circuit and a source of current supply, an external resistance arranged in said curcuit, a relay comprising coils and an armature, the coils being electrically connected in said circuit intermediate of said resistance and the rails of the track circuit, an adjustable resistance in the coil-connection, while the armature of the relay is adapted to shunt the first mentioned resistance when the voltage of the track circuit drops below a predetermined degree, while the current is allowed to pass through said resistance when the track voltage exceeds said degree.

5. An automatic voltage regulator for the track circuits of automatic signal systems, and the like, comprising, in combination with the track circuit and a source of current supply for said circuit having an adjustable resistance in said circuit, a second resistance between the first mentioned resistance and the current supply, contact points electrically connected between the two resistances and the current supply, and a relay, the coils whereof are electrically connected in said circuit intermediate of the first mentioned resistance and the rails of the track circuit while the armature of the relay is adapted to make contact with said contact points when the voltage of the track circuit falls below a predetermined degree so as to shunt the second mentioned resistance and then move out of contact with said contact points when the track voltage exceeds a predetermined degree.

FREDERICK A. TEGELER.